United States Patent [19]

Kitamura et al.

[11] Patent Number: 4,701,915

[45] Date of Patent: Oct. 20, 1987

[54] ERROR RECOVERY SYSTEM IN A DATA PROCESSOR HAVING A CONTROL STORAGE

[75] Inventors: Toshiaki Kitamura; Yuji Oinaga, both of Tokyo, Japan

[73] Assignee: Fujitsu Limited, Kawasaki, Japan

[21] Appl. No.: 763,268

[22] Filed: Aug. 7, 1985

[30] Foreign Application Priority Data

Aug. 18, 1984 [JP] Japan .................. 59-171759

[51] Int. Cl.⁴ .................. G06F 11/10; G11C 29/00
[52] U.S. Cl. .................. 371/13; 371/16; 364/200
[58] Field of Search .................. 371/12, 13, 16, 19, 371/38; 364/200 MS File, 900 MS File

[56] References Cited

U.S. PATENT DOCUMENTS

| | | | |
|---|---|---|---|
| 4,371,930 | 2/1983 | Kim | 371/13 X |
| 4,566,103 | 1/1986 | Sato | 371/12 |
| 4,598,402 | 7/1986 | Matsumoto | 371/13 X |
| 4,604,750 | 8/1986 | Manton | 371/13 X |

FOREIGN PATENT DOCUMENTS

4849  1/1981  Japan .................. 371/13

*Primary Examiner*—Jerry Smith
*Assistant Examiner*—Robert W. Beausoliel, Jr.
*Attorney, Agent, or Firm*—Staas & Halsey

[57] ABSTRACT

An error recovery system in a data processor of the pipeline type, including control storage for storing instruction data, having an error correction and detection code adapted to the detection and correction of errors, for controlling the data processor. A parity check circuit checks instructions read from the control storage and stops at least a part of pipeline processing immediately upon the detection of an error. An error correction circuit corrects the error in the read instruction data and rewrites the instruction data into the control storage while the part of the pipeline processing is stopped.

12 Claims, 5 Drawing Figures

(NORMAL STATE)

Fig. 4
ERROR CORRECTION CODE

Fig. 5

(OCCURRENCE OF ERROR)

ERROR RECOVERY SYSTEM IN A DATA PROCESSOR HAVING A CONTROL STORAGE

BACKGROUND OF THE INVENTION

1. Field of the Invention

The present invention relates to an error recovery system and method in a data processor for pipeline processing, more particularly to a system and method for recovering from an error of control storage in a data processor which is controlled by microinstructions stored in the control storage and which carries out pipeline processing.

2. Description of the Related Art

In known data processors which carry out pipeline processing of machine instructions, an error in the microinstructions read from the control storage which stores the microinstructions can obstruct the correct execution of the entire pipeline. Accordingly, in pipeline processing, an error correction code is provided in the microinstructions stored in the control storage, and the detection and correction of the error in the read-out microinstructions are carried out.

More specifically, microinstructions relating to the pipeline processing are stored in the control storage. When a microinstruction is read out, it is written in a data register. A decoder decodes the instruction in the data register to transmit it to each control point, which carries out the pipeline processing, and to the instruction is sent to the microinstruction register for a succeeding cycles.

On the other hand, the contents of the microinstructions are read out into an error detection and correction circuit. Then, an error correction code is employed to check whether there is an error bit in the instruction. When no error is detected, a pipeline controller carries out a predetermined operation according to the instruction. The pipeline controller 15 generates an instruction release signal during each cycle of the pipeline processing to execute each cycle of D(decode), A(address generation), T(translation), B(buffer access), E(execution), and W(write) normally which allows the microinstruction to be applied to the corresponding pipeline stages. The decoding of read-out machine instructions is carried out in the D cycle, an address calculation for an operand is carried out in the A cycle, an address translation of the address is carried out in the T cycle, a buffer or register is accessed in the B cycle, execution processing is carried out on the data read-out from the buffer or register in the E cycle, and the write operation for processed results is carried out in the W cycle.

When an error is detected in the instruction read out by the data register, the operation of the pipeline controller is halted and an interlock is carried out in the pipeline. In the course of interlocking, the error in the instruction is corrected in the data register and a rewrite of the correct instruction into the control storage is carried out. The error correction code can generally detect and correct a 1-bit error. For a 2-bit error, use is made of a single-error correction double-error-detection (SEC. DED) code, which can only detect 2-bit errros.

It would take considerable time for this prior art error detection and correction circuit not only to correct errors, but even to detect errors. Because of this, it has been necessary to provide an exclusive correction cycle to detect and correct errors every time an instruction is read out. The addition of such a correction cycle to the normal pipeline processing cycles, however, results in excessive augmentation of the entire pipeline processing time, so is not preferable with respect to performance. Further, when an error is detected in an instruction read out of the control storage, the processing of the machine instruction is stopped and then reexecuted in machine instruction units. In the case of a machine instruction which realizes its function through a plurality of flows, however, in some cases, the write operation to the register is performed in a flow prior to the faulty flow, and it is impossible to return to the original state before the instruction was run for reexecution (this is called "over retriable point"). In such a case, the error cannot be corrected.

SUMMARY OF THE INVENTION

The present invention is designed to eliminate the drawback of the prior art error recovery system for a control storage.

It is an object of the present invention to provide a system and method for recovering from an error in a control storage in a data processor of the pipeline type, wherein an error in an instruction read from the control storage is detected at an early stage, the pipeline system is interlocked at a stage before the instruction is carried out, and the error is corrected during the interlocking.

According to an aspect of the present invention, there is provided an error recovery system in a data processor of the pipeline type having a control storage, including control storage means for storing instruction data, having a code adapted to the detection and correction of errors, for controlling the data processor, check circuit means for checking instruction data read from the control storage means and stopping at least a part of a pipeline process immediately upon the detection of an error, and error correction circuit means for correcting the error in the read instruction data and rewriting the instruction data into the control storage while at least a part of the pipeline process is stopped.

According to another aspect of the present invention, there is provided a method for error recovery in a data processor of the pipeline type having a control storage, including the steps of: using a code for the detection and correction of errors; carrying out error detection for instruction data read from the control storage simultaneous with the calculation of operand addresses in a processing portion in which a pipeline process proceeds; stopping at least the calculation process for the operand addresses in the pipeline process upon detection of an error; correcting the instruction data in which the error is detected; and restarting, after the completion of the correction, the calculation of the operand addresses using the corrected instruction data.

According to another aspect of the present invention, there is provided a method for error recovery for a data processor of the pipeline type in which at least one microinstruction is read from a control storage based upon a machine instruction and the read-out microinstruction is processed in an overlapped manner in a pipeline processing portion. The method includes the steps of using an error detection and correction code for each microinstruction stored in the control storage; checking the microinstructions read in sequence in parallel with the processing in the pipeline processing portion by means of an error detecting means; stopping the pipeline process corresponding to the microinstruction in which the error is detected and the microinstruction succeeding thereto when an error is detected in the content of a microinstruction for a machine instruction; correcting the error in the microinstruction by the error correction means; and restarting the pipeline process after the completion of the correction of the microinstruction on the basis of the corrected microinstruction. The error recovery is therefore carried out by stopping and subsequently restarting the pipeline process without having to reexecute the machine instruction from the beginning.

The above and other objects, features, and advantages of the present invention will be better understood from the following detailed description taken in conjunction with accompanying drawings.

DESCRIPTION OF THE PREFERRED EMBODIMENTS

Figure 1:
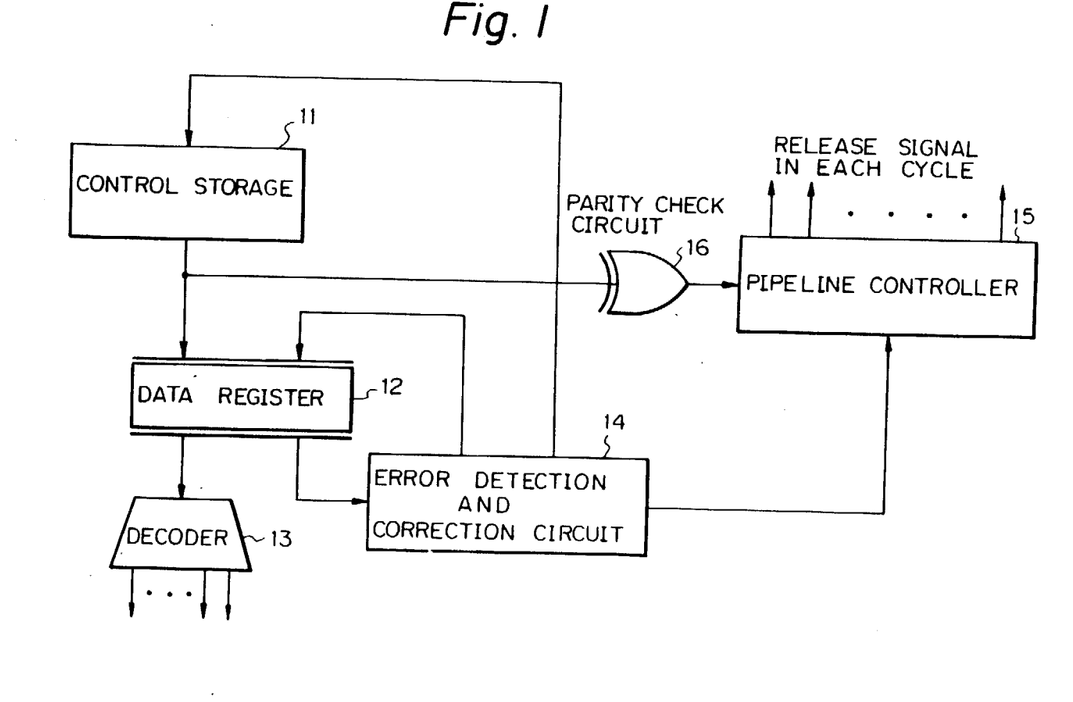
FIG. 1 illustrates in block diagram form a preferred embodiment of the present invention.

A detailed description will be given of an embodiment of the present invention with reference to the accompanying drawings. FIG. 1 is a schematic block diagram of an error recovery system according to an embodiment of the present invention.

In FIG. 1, 11 is a control storage storing microinstructions for executing pipeline processing, 12 a data register in which is written the microinstructions read from the control storage 11, 13 a decoder for decoding the microinstructions, 14 a circuit for detecting and correcting the errors in the instructions, 15 a pipeline controller for generating release signals for each cycle during pipeline processing and executing each cycle in sequence, and 16 a circuit for parity checking a microinstruction code.

Figure 2:
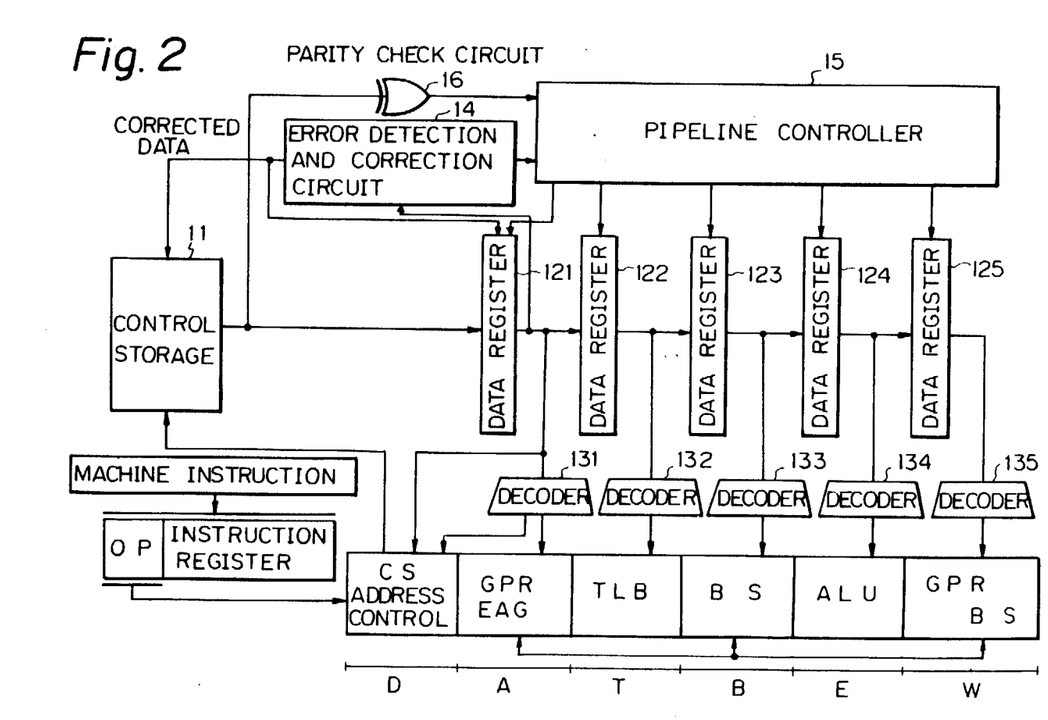
FIG. 2 is a schematic block diagram explaining the detailed structure of the embodiment in FIG. 1 in accordance with the present invention.

FIG. 2 shows an example of the detailed structure of the portions in FIG. 1. Reference numerals 121 to 125 are data registers. Reference numerals 131 to 135 are decoders. One output of 131 is conveyed to the control storage to carry out address control. The other output of 131 is conveyed to a general-purpose register (GPR) and an effective address generator (EAG). On the other hand, based on a machine instruction, the output of an instruction register is sent to control storage address control. The output of the decoder 132 is sent to a translation look-aside buffer (TLB). The output of the decoder 133 is sent to a buffer storage (BS). The output of the decoder 134 is sent to an arithmetic logic unit (ALU). The output of the decoder 135 is sent to a general-purpose register (GPR) and a buffer storage. The content of the control storage 11 is sent to the parity check circuit 16 and a register 121. The output of the error detection and correction circuit 14 controls the control storage 11 as a corrected data and controls the pipeline controller 15. The input signal of the decoder 131 controls the control storage address control and the output signal is transmitted to the control storage 11.

Describing, with reference to FIG. 1, the operation in the case of no error in the microinstruction read from the control storage 11, a microinstruction for pipeline processsing read from the control storage 11 is written into the data register 12 and the parity check circuit 16, simultaneously. The decoder 13 decodes the microinstruction stored in the data register 12 to send it to each control point for the pipeline processing and to the microinstruction register for the next cycle. On the other hand, the contents of the microinstruction are read out into the error detection and correction circuit 14.

Figure 3:
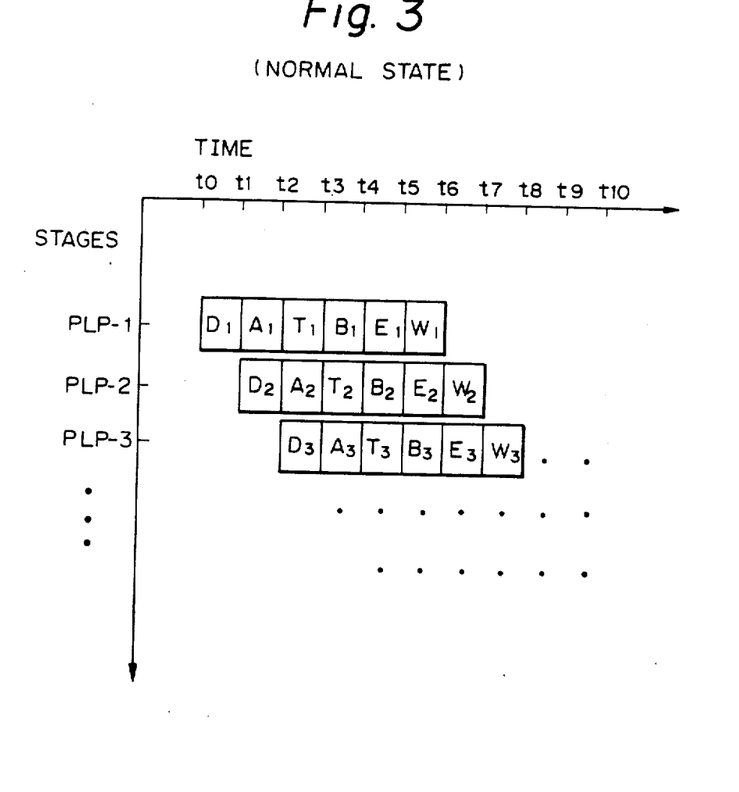
FIG. 3 is a time chart of the operation in a pipeline process in the case of no error.

If no error is detected by the parity check circuit 16 or the error detection and correction circuit 14, the pipeline controller 15 executes a predetermined operation. Specifically, the pipeline controller 15 generates a release signal for each cycle of the pipeline processing to execute in sequence normal-state pipeline processing, for instance, PLP-1 and PLP-2, as shown in FIG. 3. The operation of pipeline processing in FIG. 3 is the same as in the prior art.

Next, an explanation of the operation when an error exists in the microinstruction read from the control storage 11, and when an error correction code is used for the microinsturction are provided.

Figure 4:
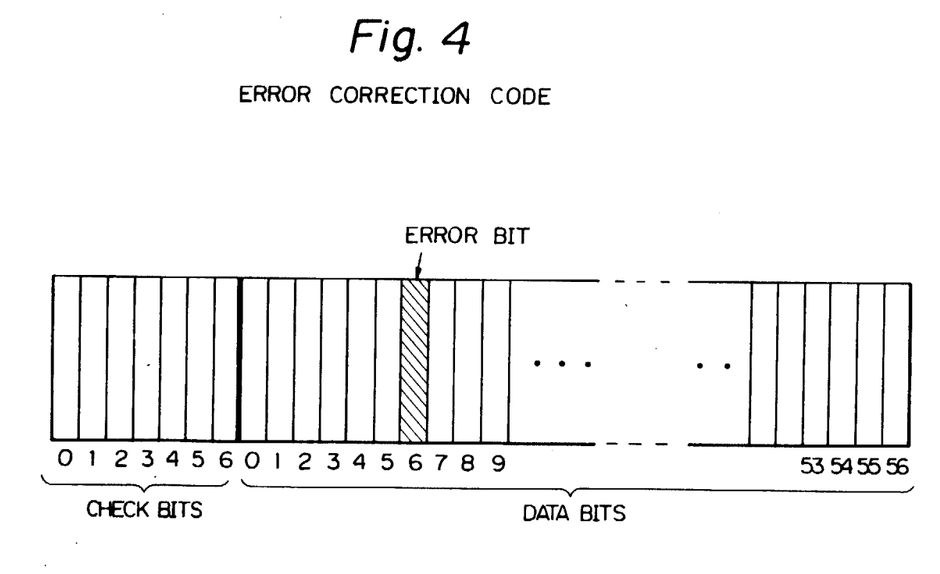
FIG. 4 is a schematic block diagram explaining an error correction code in the microinstruction.

The error correction code of the microinstruction, as shown in FIG. 4, is composed of check bits and data bits. The error correction code is constructed in a manner such that the error bit can be corrected by using the exclusive OR logic in connection with the parity check.

The error correction code ECC used is an SEC-DED code, which, as stated above, is able to detect and correct the error for a 1-bit error and to detect the error for a 2-bit error. In the present invention, the code is given a definite parity. The data bit of the 1-bit error detection and correction code is made a 1-bit detection bit and a parity appended throughout to obtain the SEC.DED code. The SEC.DED code is thus made to be, for instance, an even parity. When an error correction code ECC which is itself even parity is employed, an error of odd bits can easily be detected by the parity check. The error correction code ECC according to the present invention is not limited to an even parity, but since a bit error is usually a 1-bit error, use, as an ECC, of an SEC.DED code which is able to detect and correct a 1-bit error and to detect a 2-bit error and which is itself an even parity enables realization of an error correction code ECC with a desired definite parity without having to provide a special additional circuit.

When the microinstruction is read from the control storage into the parity check circuit 16, the parity check circuit 16, which comprises exclusive OR circuits, detects whether or not there is a bit error in the microinstruction by means of the parity check. It can detect bit errors in the microinstruction before the termination of the A cycle due to the high speed of the parity check. Accordingly, the pipeline controller 15 can be stopped before a move from the A cycle to the next T cycle, for interlocking of the pipeline.

Figure 5:
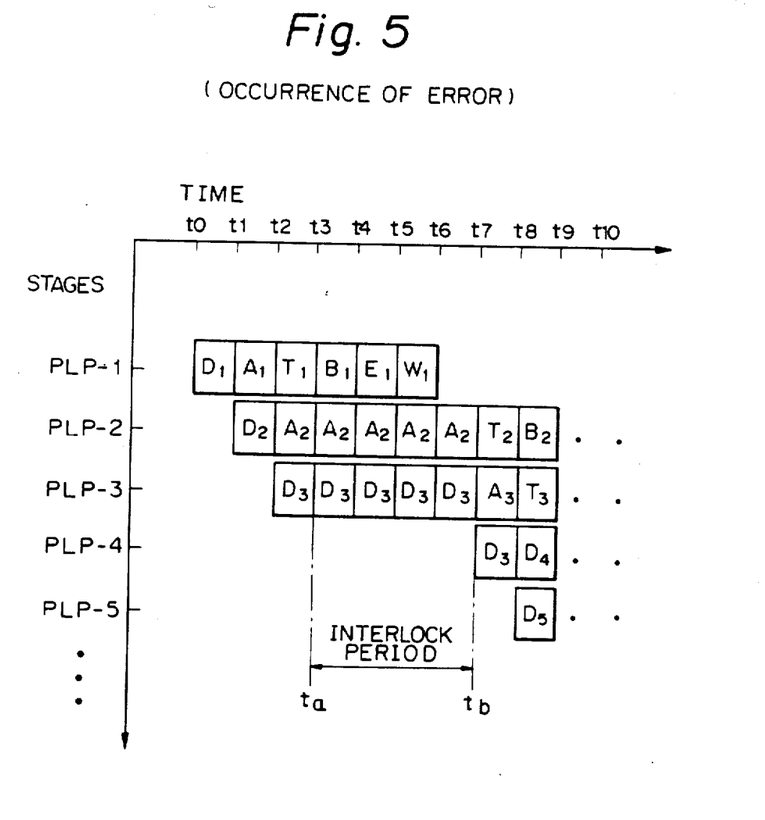
FIG. 5 is a time chart of the operation in a pipeline process in the case of an error.

FIG. 5 is a timing chart of the operation in each pipeline, when an error is detected in the microinstruction by using the parity check. In FIG. 5, pipeline processing is carried out in a normal condition through the pipeline processing stage PLP-1. At the pipeline processing stage PLP-2, an error is found in the microinstruction read from the control storage 11. Specifically the parity check circuit 16 detects the error in the microinstruction using the parity check in the $A_2$ cycle and it stops the pipeline controller 15 before it proceeds to move on to the next $T_2$ cycle, thus interlocking the pipeline (Refer to $t_a$ in FIG. 5). Once the pipeline is interlocked, the pipeline processing stage PLP-1, before the stage PLP-2, is kept unchanged and the flows of $T_1$, $B_1$, $E_1$, and $W_1$ proceed. The flow of each pipeline starting from the stage PLP-2 is stopped, as shown in the figure, i.e. the wait state is entered with the $A_2$ cycle state of the stage PLP-2 and with the $D_3$ cylce state of the stage PLP-3. From the stage PLP-4 on, read-out of the microinstruction is not carried out.

While the pipeline is in an interlocked state, the error detection and correction circuit 14 corrects the bit error produced in the microinstruction in the data register 12 by means of the error correction code ECC and, as the case may be, rewrites the correct microinstruction into the control storage 11. When the correction of the bit error and the rewriting into the control storage 11 are over at a time $t_b$, the interlock is released and the pipeline processing stages from stage PLP-2, inclusive, are restarted after the cycle before the interlocking.

The foregoing embodiment was explained with reference to the use of a microinstruction as a command. The commands, however, are not limited to microinstructions. Also, the error correction code ECC is not restricted to an SEC.DED code.

Since there are both a parity check circuit and an error detection and correction circuit in the present invention, it is also possible to detect any trouble in the circuits based on an inconsistency in results of the checks, for instance, no error in the parity check, but a 1-bit error in the ECC check.

Also, when there is a defect in the control storage, causing an error in the instruction, the error will be continually generated in the read instruction. In this embodiment, when an error occurs in the rewritten instruction a predetermined number of times, the rewrite into the control storage can be stopped based on the reason that there is an error in the control storage itself and the processing can be continued. The defect in the control storage can then be repaired separately to restore the control storage to its former state.

According to the present invention, there is provided a system for recovering from errors of the control storage in a data processor of the pipeline type controlled by microinstructions in a control storage. A parity check circuit employs a definite parity for the error correction code in the instruction. The parity of the instruction read from the control storage is checked and, as soon as an error is detected in the parity, the pipeline system is interlocked. An error detection and correction circuit corrects the error of the instruction read out in the course of interlocking, and as the case may be, rewrites the correct instruction into the control storage. Using these circuits, the error detection occurs while the instruction is executed before a T (translation) cycle and the pipeline system is interlocked therewith, thus enabling correction of errors per flow unit of the instructions.

We claim:

1. An error recovery system in a data processor of the pipeline type having a plurality of pipeline stages and a control storage, comprising:
   control storage means for storing instruction data, having a code for the detection and correction of errors, and for controlling said data processor;
   check circuit means for checking instruction data read from said control storage means and upon the detection of an error during said checking, stopping the pipeline processing of a stage being processed at the time the error occurred along with prior stages, and allowing processing of stages subsequent to the stage containing the error to continue; and
   error detection circuit means for correcting the error in the read instruction data and rewriting the instruction data into said control storage while the pipeline process stages are stopped.

2. A system according to claim 1, wherein said data processor comprises:
   means for calculating operand addresses;
   means for controlling reading of operand data;
   means for performing an arithmetic or logical calculation, wherein the means for calculating operand addresses is halted upon detection of the error.

3. A system according to claim 1, wherein said instruction data stored in said control storage means is a microinstruction.

4. A system according to claim 1, wherein said code adapted to the correction of error is a single error correction, double error detection code.

5. A method of error recovery for a data processor of the pipeline type having control storage means and performing processing in stages, comprising the steps of:
   using, as a part of instruction data stored in said control storage means, a code adapted to the detection and correction of errors;
   carrying out error detection for instruction data read from said control storage means simultaneously with the calculation of operand addresses in a processing portion in which a pipeline process proceeds;
   stopping a calculation process stage for operand addresses in said pipeline process upon detection of an error and allowing subsequent stages to continue;
   correcting the instruction data in which the error is detected; and
   restarting, after the completion of said correction, the calculation process stage for operand addresses using the corrected instruction data.

6. A method as recited in claim 5, further comprising a step of stopping stages prior to a stage in which a parity error is detected and starting said prior stages when said parity error is corrected.

7. A method of error recovery for a data processor of the pipeline type in which at least one microinstruction is read from a control storage based upon a machine instruction and said microinstruction is processed in an overlapped manner in a pipeline processing portion, said method comprising the steps of:
   providing an error detection and correction code for each microinstruction stored in said control storage;
   checking said microinstructions for errors as read in sequence in parallel with the microinstruction processing in said pipeline processing portion using an error detecting means;
   stopping only the pipeline processes corresponding to the microinstruction in which an error is detected and the microinstruction succeeding thereto, when an error is detected in a microinstruction for a machine instruction;
   correcting said error in the microinstruction using error correction means; and restarting the pipeline process after the completion of the correction of said microinstruction on the basis of the corrected microinstruction, an error recovery being carried out by stopping and subsequently restarting the pipeline process without performing an execution of said machine instruction from a beginning.

8. A method of error recovery in a pipeline processor having a control storage and performing processing in stages, comprising the steps of:
(a) reading a microinstruction out of the control storage;
(b) performing a parity check of the microinstruction simultaneously with performing an operand address calculation;
(c) stopping an operand address calculation stage if a parity error is detected and allowing subsequent stages to continue;
(d) correcting the microinstruction and restarting the operand address calculation stage; and
(e) performing pipeline operations in dependence on the corrected microinstruction.

9. A method as recited in claim 8, further comprising the step of replacing the read microinstruction in control storage with the corrected microinstruction.

10. A method as recited in claim 8, further comprising a step of stopping stages prior to a stage in which a parity error is detected and starting said prior stages when said parity error is corrected.

11. An error recovery system in a pipeline processor having control storage connected to pipeline control registers connected to pipeline processing stages, said system comprising:
a parity check circuit, operatively connected to the control storage and a first of the control registers, checking parity of a microinstruction transferred from the control storage to the first of the control registers and stopping pipeline processing only in accordance with the contents of the first of the control registers when a parity error is detected;
an error detection and correction circuit, operatively connected to the control storage and the first of the control registers, detecting and correcting the microinstruction transferred from the control storage to the first of the control registers while processing is stopped.

12. A system as recited in claim 11, further comprising a pipeline controller, operatively connected between the parity check circuit and the control registers, for releasing the microinstruction in the first control register to successive control registers and the corresponding pipeline processing stages in dependence on the parity check.

* * * * *

UNITED STATES PATENT AND TRADEMARK OFFICE
CERTIFICATE OF CORRECTION

PATENT NO. : 4,701,915

DATED : October 20, 1987

INVENTOR(S) : Kitamura et al.

It is certified that error appears in the above-identified patent and that said Letters Patent is hereby corrected as shown below:

Col. 1, line 30, "the" should be --a--;

line 61, "(SEC. DED)" should be --(SEC.DED)--.

Col. 3, line 46, delete "code".

Col. 4, line 31, "SEC-DED" should be --SEC.DED--.

Col. 6, line 7 (Claim 1), "detection" should be --correction--.

Col. 8, line 13 (Claim 11), after ";" insert --and--.

Signed and Sealed this

Tenth Day of May, 1988

Attest:

DONALD J. QUIGG

*Attesting Officer*

*Commissioner of Patents and Trademarks*